(12) United States Patent
Lee et al.

(10) Patent No.: US 6,498,679 B2
(45) Date of Patent: Dec. 24, 2002

(54) MICRO-RETARDER PLATE

(75) Inventors: Kuen Lee; Chao-Hsu Tsai, both of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/745,885

(22) Filed: Dec. 21, 2000

(65) Prior Publication Data

US 2001/0040730 A1 Nov. 15, 2001

(30) Foreign Application Priority Data

Dec. 24, 1999 (TW) ..................................... 88122875 A

(51) Int. Cl.⁷ ............................................... G02B 5/30
(52) U.S. Cl. ...................... 359/483; 359/494; 359/495; 359/608; 348/58
(58) Field of Search ............................. 359/483, 608, 359/494, 495; 348/58

(56) References Cited

U.S. PATENT DOCUMENTS 5,327,285 A    7/1994  Faris
5,537,144 A *  7/1996  Faris ............................ 348/58
5,668,663 A *  9/1997  Varaprasad et al. ......... 359/608
5,844,717 A   12/1998  Faris \* cited by examiner

*Primary Examiner*—Cassandra Spyrou
*Assistant Examiner*—Craig Curtis
(74) *Attorney, Agent, or Firm*—J.C. Patents

(57) ABSTRACT

A micro-retarder plate using a single plate with phase retardation. The plate with phase retardation having a pattern that further comprises a plurality of first retardation state areas and second retardation state areas alternating with each other is formed on the micro-retarder plate. The pattern is formed using an infra-red laser to expose the plate with phase retardation, or using a circuit board with a pattern of electrothermal resistor thereon in contact with the plate of phase retardation. The linear polarized lights with direction of polarization being 45 degrees to the stretching direction of the retardation film passing through the first retardation state areas and the second retardation state areas are perpendicular to each other. The micro-retarder is laminated between two protection layers with index matching glue to remove the scattering effect caused by the heat process.

6 Claims, 4 Drawing Sheets

MICRO-RETARDER PLATE

CROSS-REFERENCE TO RELATED APPLICATION

This application claims the priority benefit of Taiwan application serial no. 88122875, filed Dec. 24, 1999.

BACKGROUND OF THE INVENTION

1. Field of the Invention

The invention relates to a micro-retarder plate, and more particular, to a micro-retarder plate using only a single layer of retardation material that can be applied in a three-dimensional stereo imaging and display system.

2. Description of the Related Art

Processing a polarizer or a phase retarder to obtain a pattern thereon, and applying the patterned polarizer or phase retarder to a liquid crystal display screen, a three-dimensional stereo imaging can thus be provided for audience wearing a pair of polarization glasses. In U.S. Pat. No. 5,327,285, the fabrication method performed on a micro polarizer includes ink printing and photolithography. U.S. Pat. No. 5,844,717 also discloses using method of etching photoresist to fabricate micro-polarizer.

In the above prior arts U.S. Pat. No. 5,327,285 and U.S. Pat. No. 5,844,717, as shown in FIG. 1A to FIG. 1C, two polarizers 102 and 104 processed with polarization directions vertical to each other are required. By laminating these two polarizers and alternating the patterns thereof, an observer wearing a pair of glasses can see a three dimensional image using this lamination 106. For example, as shown in FIG. 1C, lamination 106 of micro-polarizer is disposed in front of a liquid crystal display 108 that comprises left-eye vision areas and right-eye vision area alternating with each other. As shown in FIG. 1C, aligning with the liquid crystal display 108, two polarization directions 112 are alternating each other corresponsive with the left- and right-eye vision areas. An observer wearing a pair of glass 110 can thus see a three-dimensional image. However, as the patterns on the polarizers are typically very small in dimension, so that it is very difficult to aligning two patterns exactly alternating to each other. While misalignment occurs, it is easily to cause a double image that seriously affects the stereo effect. In addition, using the micro-polarizer reduces the incident light into less than a half in intensity since double layer micro-polarizers are used. Therefore, the brightness of the image is very often a problem for such a display system.

SUMMARY OF THE INVENTION

The invention provides a micro-retarder plate, comprising a single plate with phase retardation. The plate with phase retardation comprises a pattern that further comprises a plurality of first retardation state areas and a plurality of second retardation state areas alternating with each other. The pattern is formed using an infra-red laser to expose the plate with phase retardation, or using a circuit board with a pattern of electrothermal resistor thereon in contact with the plate of phase retardation. The micro-retarder is laminated between two transparent layers for index-matching. The transparent layers can further be laminated with two protection layers.

Thus formed, only a single plate with phase retardation is required, so that the material consumption is greatly reduced. Using only a single plate of retardation material to form the micro-retarder, the alignment of the areas between two polarizers with different polarization state is no longer required and thus the double image caused by misalignment is prevented. Furthermore, the brightness of the light passing through the micro-retarder using single plate can be maintained. In addition, without using the conventional chemical process, the environment pollution can also be prevented.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate an embodiment of the invention and together with the description, serve to explain the principles of the invention. In the drawings.

DESCRIPTION OF THE PREFERRED EMBODIMENTS

In a preferred embodiment of the invention, a plastic material such as Arton, PC or PVA, are heated to destroy the internal order of molecules direction thereof, so as to decrease the phase retardation. Using a programmable infra-red laser to process a uniform phase retardation plate, areas with different phase retardation are formed being exposed with different laser energy. Thus, a precise pattern with micro-retardation is formed.

Figure 2:
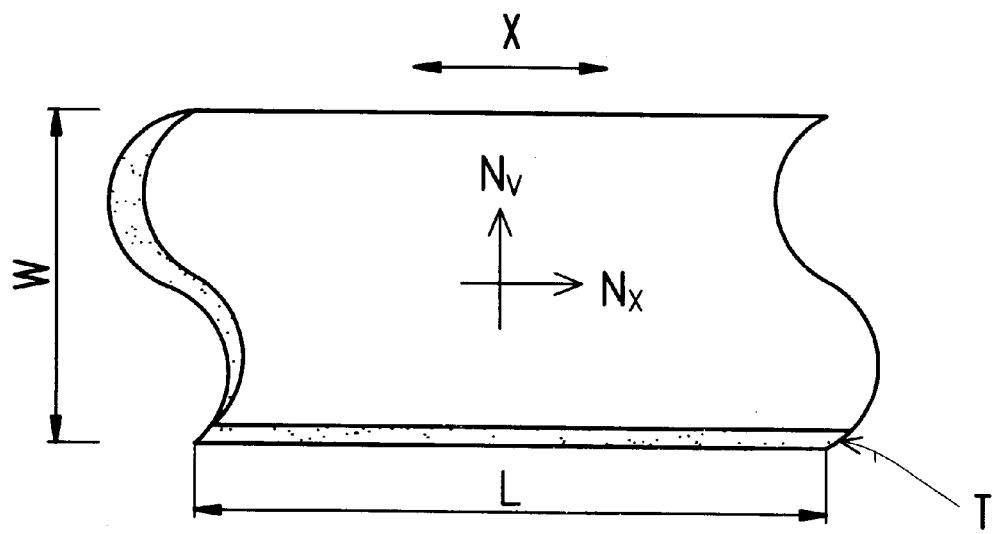
FIG. 2 shows the plate of polymer of thin film material being stretched to form a plate with phase retardation.

A uniform phase retardation plate includes a plate or thin film of polymer with uniform thickness being stretched in a particular direction. For the single axis stretching treating, phase retardation occurs between the x-direction and y-direction as shown in FIG. 2. As shown in the figure, the plate or thin film of polymer has a length of L and a width of W. The stretching treatment is performed lengthwise, that is, along the x-direction. The phase retardation can be represented by the equation:

$$\Phi = (2\pi d \cdot \Delta/V)/\lambda$$

$$\Delta = N_x - N_y$$

wherein $\Phi$ is the phase retardation, d is the thickness of the material, $\lambda$ is the wavelength, and $N_x$ and $N_y$ are the refractive index for incident light with electric field in x-direction and y-direction, respectively. Provided that the relative parameters are appropriately controlled, $\Delta/V \cdot d$ can be controlled as a half of a certain wavelength (i.e. $\Phi$ equal to $\pi$), and this is called a half-wavelength compensator or a half-wavelength phase retarder.

Figure 3:
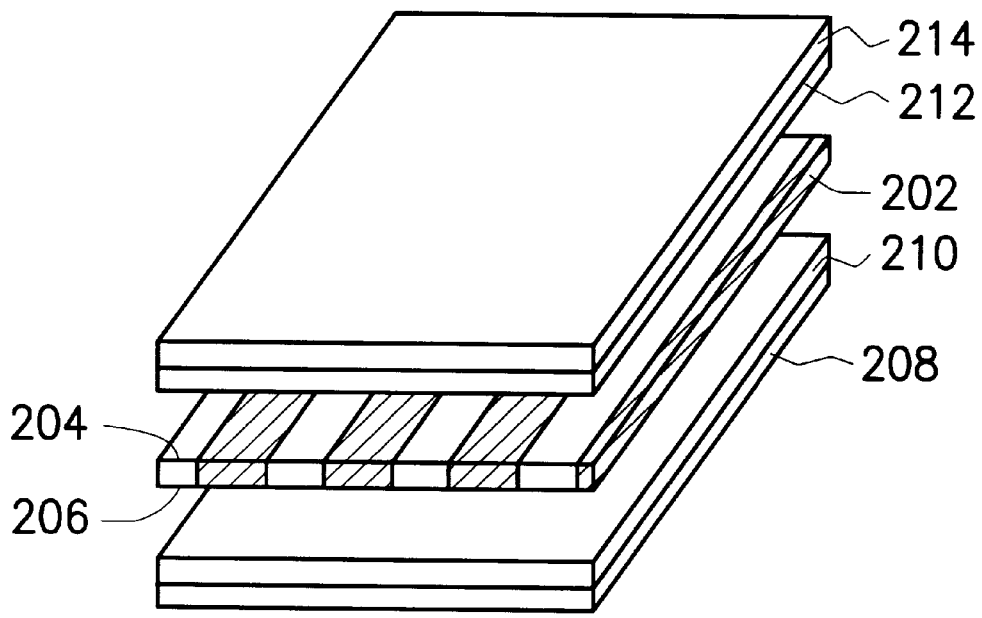
FIG. 3 shows a structure of a micro-retarder.

When such a retarder (e.g. the commercial compensator used in LCD, ARTON film made by JSR Co., PC film made by Nitto Denko Co. and the PVA film) is processed using an infra-red laser, for example, a $CO_2$ laser, the retardation of the processed area will decrease. By controlling the heat processing conditions, the direction of molecular chains in the exposed portion of the phase retarder are made as random as possible, and the phase difference between the x-direction and the y-direction of polarization is approximately zero. That is, the original phase retardation of the exposed portion of the phase retarder is reduced to zero. On the other hand, the phase difference between the x-direction and the y-direction of polarization is unchanged in the unexposed portion of the phase retarder. In FIG. 3, a phase retarder 202 includes a hatched area and a blank area. The hatched area is the area exposed to the infra-red laser, so that the phase retardation of the phase retarder is zero. In contrast, the blank are is not processed by the infra-red laser, that is, not experienced the thermal treatment, so that the original phase retardation caused by the stretching treatment remains unchanged. As shown in the FIG. 3, typically, the hatched area with zero phase retardation and the blank area with the phase retardation caused by the heating treatment alternating with each other with identical dimension, and preferably, are strip-like. In this manner, the micro-retarder 202 with alternate phase retardation in a specific pattern is obtained. The micro-retarder 202 further comprises a plurality of the first retardation state areas and a plurality of the second retardation state areas alternating with each other. For example, the first retardation state includes half wave retardation and the second retardation state includes zero retardation or vice versa. When a linear polarized light is incident on the micro-retarder with polarization axis being 45 degrees with the stretching direction of the retardation film, the polarization directions of the light passing through the first and second retardation state areas are perpendicular to each other.

For a normal plastic material, in addition to the phase variation, a deformation is induced due to the thermal treatment of the infra-red laser energy to cause a scattering effect upon the surface of the material. The layers of index matching glue 212 and 210, for example, an epoxy layer, are thus coated on the surface 204 and 206 of the phase retarder 202 respectively. The refraction index of the index matching glue layers 212 and 210 are homogeneous and very close to the phase retarder 202. Thus, refraction does not occur at the interface between the layer of index matching glue and the phase retarder as the polarized light passing through the interface. For further planarizing layer of index matching glue, the protection layers 208 or 214 are further adhered thereon respectively to obtain the functions of transparent and protection. It is appreciated that the material for the protection layer must have a negligible birefringence, for example, glass, acrylic material, casting Arton plastic film, TAC, CAB. Preferably, as shown in FIG. 3, both surfaces 204 and 206 of the micro-retarder 202 are covered by the layers of index matching glue 212 and 210, respectively. Or alternatively, both the surfaces 204 and 206 of the micro-retarder 202 are covered by the laminations of the layer of index matching glue and the protection layer 212 and 214, and 210 and 208, respectively.

Figure 1A:
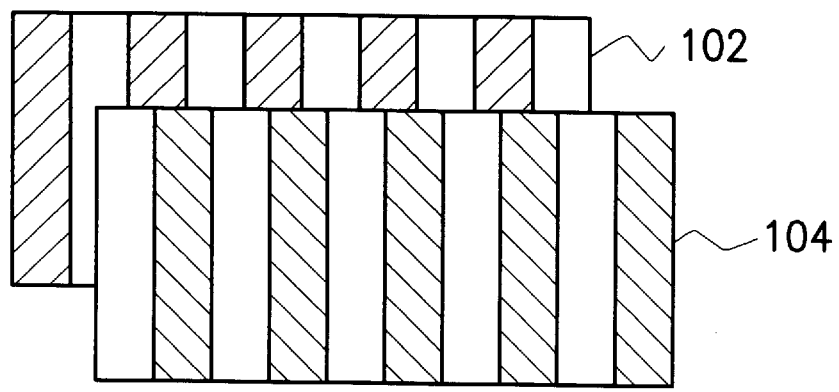
FIG. 1A to FIG. 1C show the structure of a conventional micro-polarizer, and the way to observe a three-dimensional image using this conventional micro-polarizer.
Figure 1B:
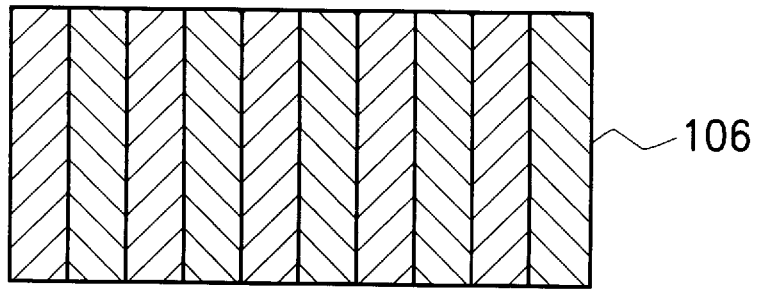
Figure 1C:
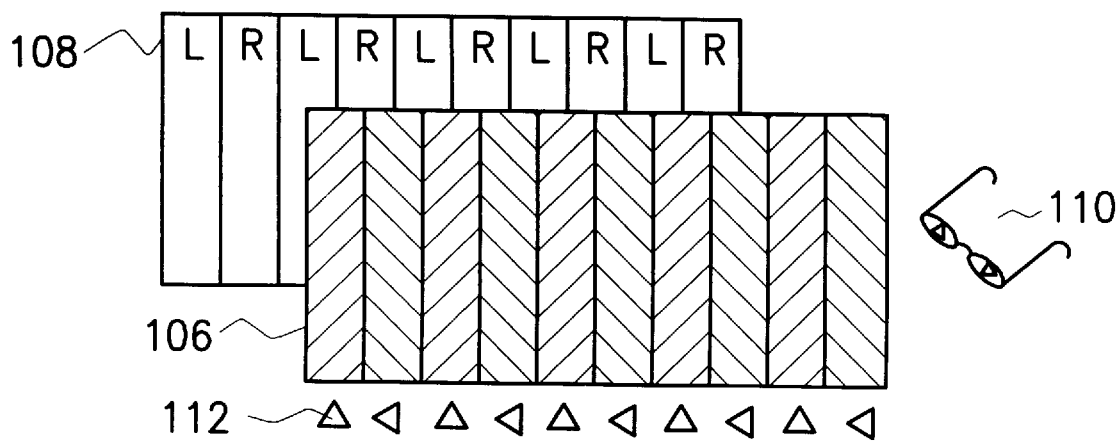

Compared to the conventional structure as shown in FIGS. 1A to 1C, a single layer of micro-retarded is implemented here. Therefore, the defects or drawbacks caused by misalignment are all eliminated. Furthermore, processing and patterning two micro-polarizers definitely consumes at least double of time and cost comparing to processing only one micro-retarder. Therefore, both time and cost consumption are greatly reduced. In terms of resolution and function, the conventional printing method for patterning has a limitation in resolution (about 20 micron), and the conventional method for etching photoresist is restricted by processing area (about 8 inches), whereas, the laser process can approach a resolution of 10 microns, and the processing area is relative to the working platform, so that a screen of 20 inches to 30 inches is out of problem. In addition, this invention uses a pollution free process without the chemical etching process.

In addition to the above distant type of thermal treatment using an infra-red laser, a contact-type thermal treatment for patterning the layer of plastic material to form the micro-retarder 202 can also be used in the invention. A non-conducting plate with a pattern of thermal electric resistor, for example, a circuit board with a pattern of copper, is provided. The circuit board is laminated upon and with the circuit pattern facing the layer of plastic material with phase retardation. When an electric current is applied to the circuit board, the heat generated in the thermal electric resistor is transfer to plastic material, and thus cause the phase retardation of the area contact with the thermal electric resistor to decrease. Therefore, a pattern is uniformly pressed on the plastic material. The resultant structure and pattern is equivalent to those made using the infra-red laser.

Figure 4:
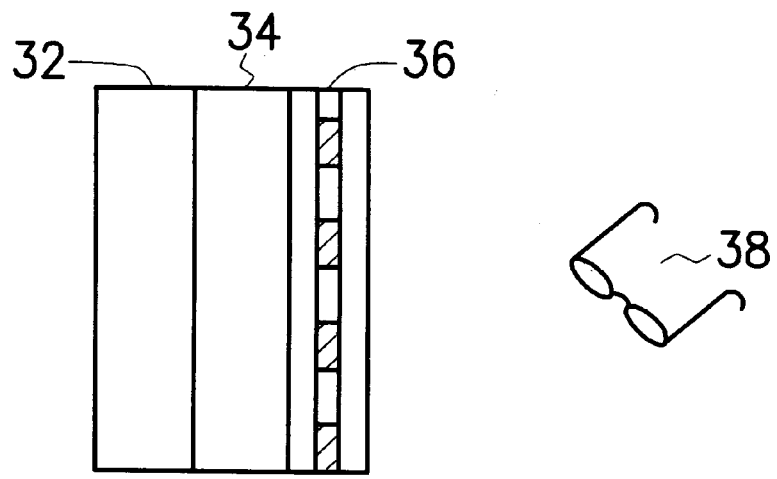
FIG. 4 shows an application of the micro-retarder for an observer wearing a pair of polarization glasses.

FIG. 4 shows an application of the micro-retarder. For an observer wearing a pair of polarization glasses 38, a three-dimensional image can be seen through the structure comprising the back light module 32, the LCD panel 34, and the lamination of the micro-retarder 36.

Figure 5:
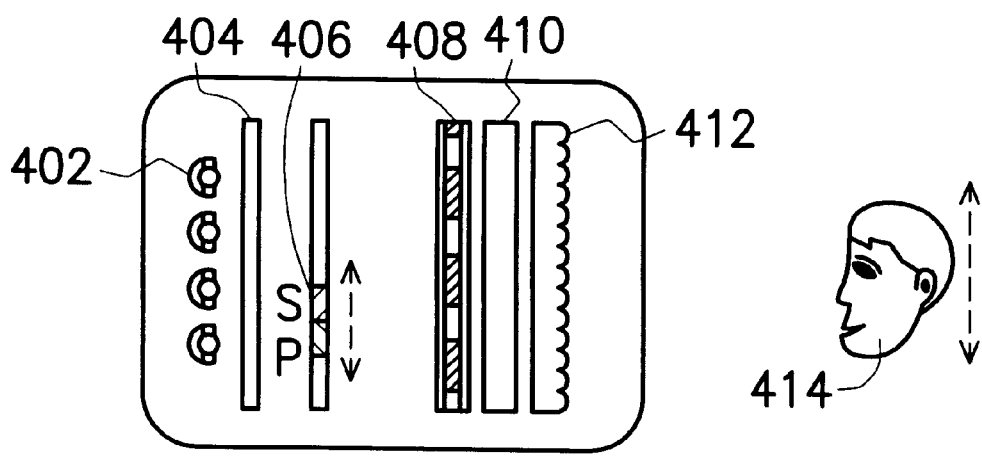
FIG. 5 shows another application of the micro-retarder for naked eyes to observe a stereo image.

FIG. 5 shows another application of the micro-retarder. In FIG. 5, a system providing a three-dimensional image for naked eyes is shown. An imaging apparatus 412 is disposed in front of a light source 402. A polarization apparatus 406 coupled with a tracking module is disposed between the light source 402 and the imaging apparatus 412 coupled with a tracking module. The distance between the polarization apparatus 406 and the imaging apparatus 412 is larger than the focal length of the imaging apparatus 412. A light diffusing plate 404 is disposed between the light source 402 and the polarization apparatus 406 and the imaging plate 410 is disposed between the polarization apparatus 406 and the imaging apparatus 412. The micro-retarder 408 is disposed between the polarization apparatus 406 and an imaging plate 410 behind the imaging apparatus 412. A lamp or a point light source array of projection type such as white LED array can be used as the light source 402. Transmitting through the light diffusing apparatus 404, a light emitted from the light source 402 becomes more uniform. Through the polarization apparatus 406 being coupled with a tracking module, two different kinds of polarized lights, for example, P-type and S-type polarized lights, are formed. The imaging plate 410 can be the LCD panel, the images for left and right eye vision are alternately displayed on different horizontal or vertical strips of the LCD panel corresponding to the horizontal or vertical strips of the micro-retarder 408. For example, the image for left eye vision is displayed in the areas corresponding to the thermal-treated portion of the micro-retarder, and the image for right eye vision is displayed in the areas corresponding to the untreated portion of the micro-retarder. The imaging apparatus 412 comprises Fresnel lens to display the virtual image formed by the imaging plate 410 and the micro-retarder 408 mentioned above. And the real images of the left eye vision and the right eye vision formed by the imaging plate 410 are projected to the right and left eye of the observer respectively. According to the phase retardation and the parallax, the stereo image can be observed by the observer with naked eyes.

Figure 6:
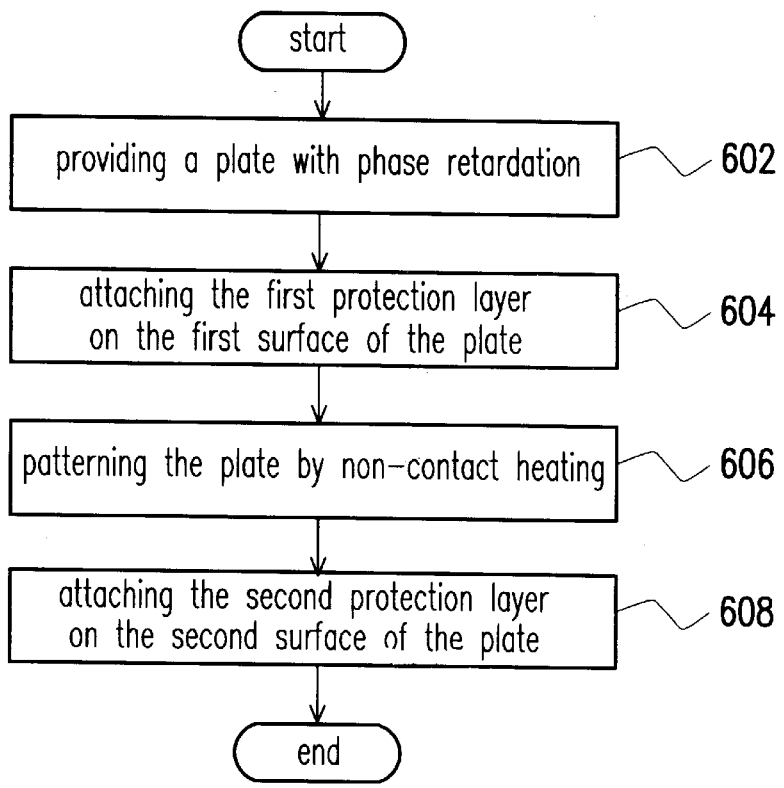
FIG. 6 shows a process for fabricating a micro-retarder.

FIG. 6 is a process flow showing a method for fabricating a micro-retarder. In step 602, a plate with phase retardation is provided for fabricating the micro-retarder. The first protection layer is laminated on and attached to the first surface of the plate with phase retardation through the first transparent layer used for index-matching in step 604. Using an infra-red laser, the plate with phase retardation is patterned into a micro-retarder by non-contact heating in step 606. The second protection layer is further laminated onto the second surface of the micro-retarder through the second transparent layer used for index-matching in step 608.

Figure 7:
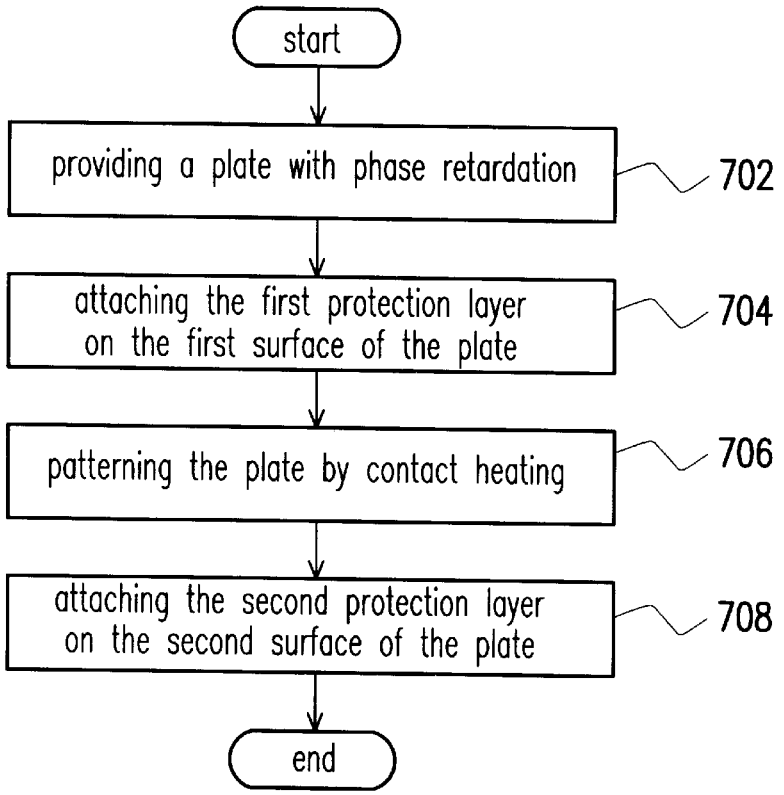
FIG. 7 shows another process for fabrication a micro-retarder.

FIG. 7 is another process flow showing a method for fabricating a micro-retarder. In step 702, a plate with phase retardation is provided for fabricating the micro-retarder. The first protection layer is laminated on and attached to the first surface of the plate with phase retardation through the first transparent layer used for index-matching in step 704. Using circuit board with a pattern of electrothermal resistor in contact with the plate with phase retardation, the plate with phase retardation is patterned into a micro-retarder in step 706. The second protection layer is further laminated onto the second surface of the micro-retarder through the second transparent layer used for index-matching in step 708.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for forming a micro-retarder plate, comprising:

providing a plate with phase retardation having a first surface and a second surface;

laminating a first protection layer on the first surface of the plate with an index-matching glue layer;

patterning the plate with phase retardation to form a micro-retarder with a plurality of first retardation state areas and a plurality of second retardation state areas alternating with each other, wherein linear polarized lights with direction of polarization being 45 degrees to the stretching direction of the retardation film passing through the first retardation state areas and the second retardation state areas are perpendicular to each other; and laminating a second protection layer on the second surface of the micro-retarder with a second index-matching glue layer.

2. The method according to claim 1, wherein the step of patterning the plate with phase retardation comprises using an infra-red laser for exposure.

3. The method according to claim 1, wherein the step of patterning the plate with phase retardation comprises disposing a circuit board with a pattern of electrothermal resistor in contact with the plate with phase retardation.

4. The method according to claim 1, wherein the first and the second protection layers are formed by the materials without birefringence effect.

5. The method according to claim 1, wherein the plate with phase retardation comprises a half-wavelength retardation.

6. The method according to claim 1, wherein the first retardation state comprises half-wave retardation and the second retardation state comprises zero retardation or vice versa.

* * * * *